No. 867,669. PATENTED OCT. 8, 1907.
S. W. MILLER.
APPARATUS FOR EMPTYING LIQUID TANKS.
APPLICATION FILED MAY 25, 1907.
2 SHEETS—SHEET 1.
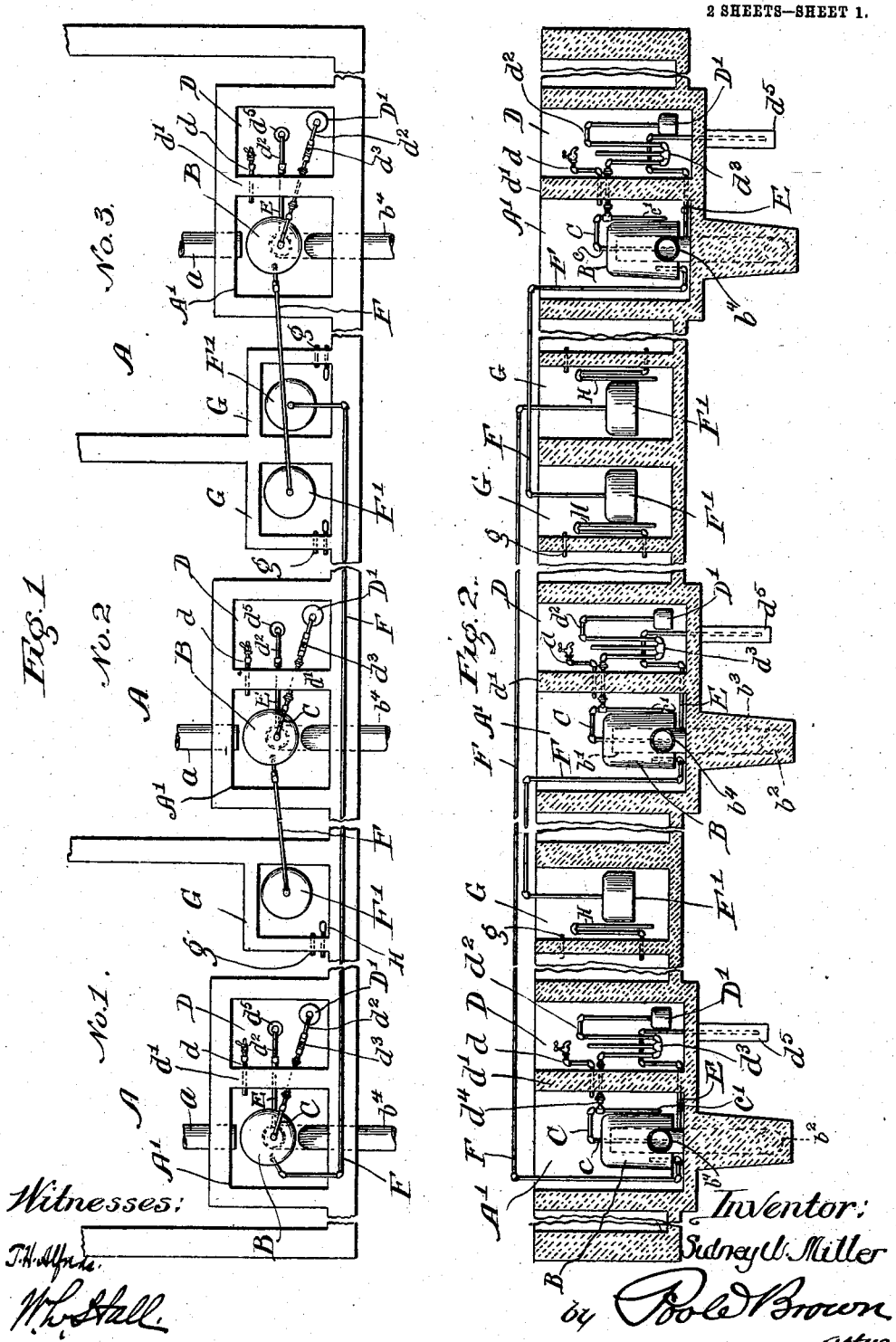

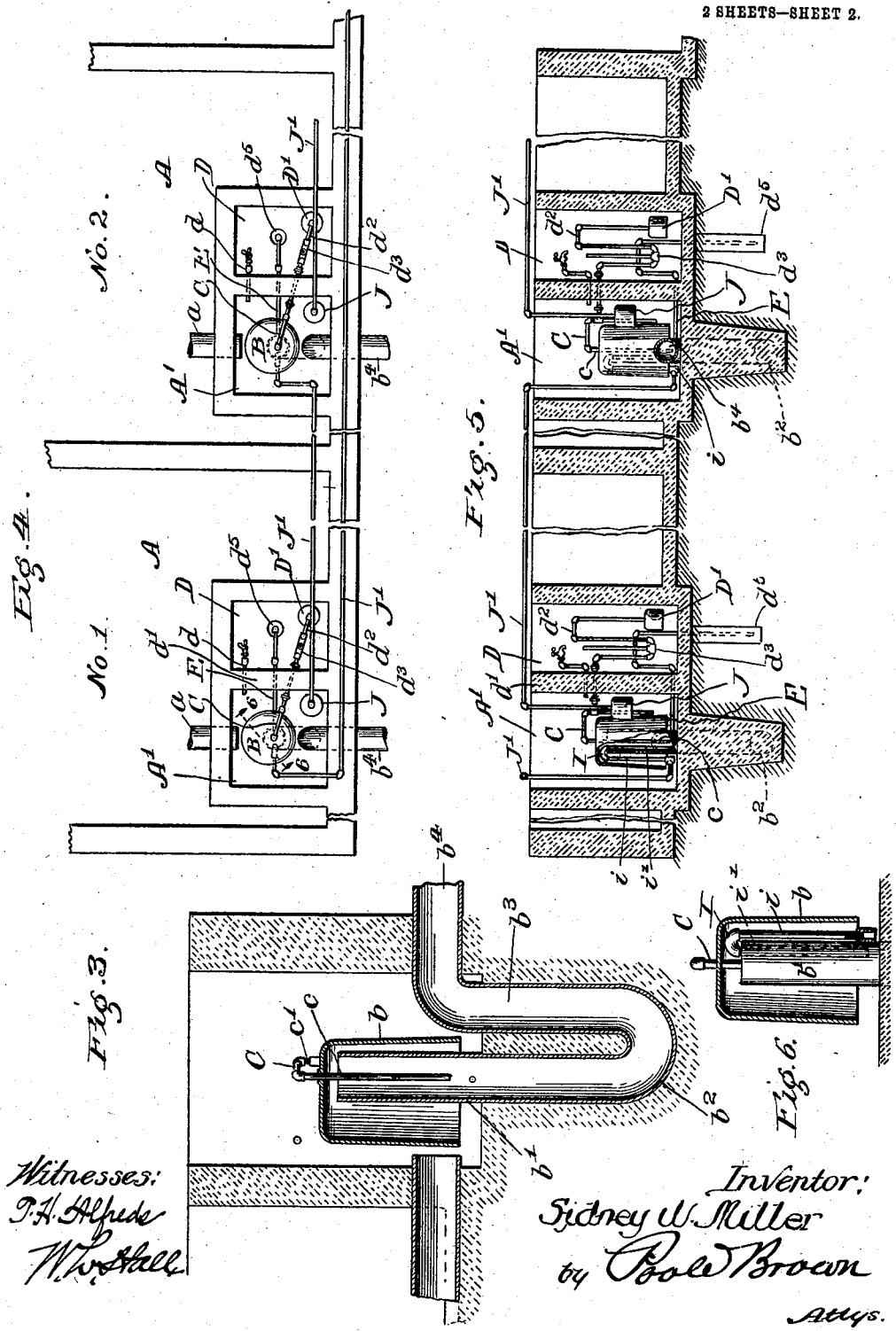

UNITED STATES PATENT OFFICE.

SIDNEY W. MILLER, OF CHICAGO, ILLINOIS.

APPARATUS FOR EMPTYING LIQUID-TANKS.

No. 867,669.  Specification of Letters Patent.  Patented Oct. 8, 1907.

Application filed May 25, 1907. Serial No. 375,582.

*To all whom it may concern:*

Be it known that I, SIDNEY W. MILLER, a citizen of the United States, and a resident of Chicago, in the county of Cook and State of Illinois, have invented certain new and useful Improvements in Apparatus for Emptying Liquid-Tanks; and I do hereby declare that the following is a full, clear, and exact description thereof, reference being had to the accompanying drawings, and to the letters of reference marked thereon, which form a part of this specification.

This invention relates to means for emptying the liquid contents of tanks or receptacles, such as the contact beds of sewage purifying systems, and the invention consists in the matters hereinafter set forth and more particularly pointed out in the appended claims.

I have shown my improvements designed for use in connection with contact beds and in the description which follows will, for convenience, hereinafter refer to the tank or receptacle to be emptied, as a contact bed. It will be understood, however, that the invention is adaptable to empty any tank or receptacle where conditions exist that are analogous to those of a contact bed with respect to the manner in which fluid flows therefrom during the emptying process.

The principal object of my invention is to provide an emptying apparatus for contact beds, or other liquid tanks or receptacles, which is so constructed and arranged that the emptying operation thereof is prolonged to such extent as to continue its operation after the contents of the bed have been substantially discharged, so as to provide for the discharge of any liquid in the bed that does not find its way at once to the emptying device, thus insuring the discharge of practically all the liquid from the bed, and preventing the accumulation of a substantial quantity of liquid in the bottom of the bed after the cessation of operation of the emptying deivce.

My improvements are peculiarly adaptable to contact beds of sewage purification systems, for the reasons below stated. A contact bed for sewage purifying systems usually comprises a tank of suitable size filled with a mass of broken stone or like material, upon which bed the sewage, after it leaves the septic tank, is discharged for further treatment, as is well known to those familiar with the art. The sewage may be discharged upon said contact bed from a dosing tank operating in connection with a plurality of beds, and provided with siphons or other filling devices which alternately discharge the contents of the dosing tank upon said contact beds; a typical construction of which dosing tank, so far as relates to the features mentioned, is shown in my prior United States Letters Patent No. 847,592, granted March 19th, 1907. The dosing tank is so proportioned to the capacity of the contact beds as to fill the contact beds to a given or predetermined level. Again the contact beds may be filled directly from the septic tank by gravity in the manner shown in the prior United States Letters Patent to Adams, No. 648,325, dated April 14th, 1900, provided with means for checking the feed flow of the liquid upon the bed when a predetermined level of the liquid in the bed had been reached. Thus, in both instances, the contact beds are filled to a predetermined level.

By reason of the large surface of the broken stone or like material to which the liquid sewage is exposed, and by reason of the further fact that said material is usually of a porous character, the liquid does not drip or flow downwardly from said material as rapidly as the ordinary emptying apparatus now in use (usually a siphonic apparatus) operates to withdraw such liquid as is presented at once thereto. That is to say, siphonic apparatus at present usually employed to empty said contact beds, after being started into operation, completes its operation quickly to withdraw the liquid which is presented promptly thereto, after which the siphon is vented and the emptying operation is discontinued. By reason of this or analogous condition, after the operation of the emptying apparatus is discontinued, liquid trickles from the broken material of the contact bed downwardly to the bottom or floor of the bed long after the emptying apparatus has ceased its action, whereby it becomes impossible to completely empty the bed and there remains after each periodic discharge of the bed a substantial quantity of the liquid therein.

It is the purpose of my invention to so control the operation of the emptying apparatus as to prolong the emptying operation thereof so as to completely discharge the liquid from the contact bed as it slowly trickles from the broken or granular material of the contact bed. Thereby I am enabled to increase the capacity of the contact bed. It is furthermore necessary in a system of this character, wherein the contact beds are periodically filled and discharged, that means be provided for discontinuing the prolonged flow of liquid through the emptying apparatus before another charge of the liquid sewage is discharged upon the bed. Otherwise, if this provision be not made there would be likelihood of the contact bed being again charged before the emptying operation is discontinued, in which event the liquid so discharged upon the bed would not remain thereon but would pass at once therefrom through the emptying device. To this end I provide automatic means, herein shown as set in operation by the rise of liquid in a tank or receptacle associated in some suitable timing relation with the contact bed being filled and emptied in such manner that the emptying device is put out of operation before the bed associated with it is again filled. When operating with a number of contact beds, the controlling means for the emptying apparatus of the several contact beds may be set in operation by the rise of liquid in said beds, the controlling means for each emptying device being set in operation by the rise of liquid in a bed in advance thereof relatively to the order of operation of said beds.

The means which I have herein shown for emptying the contact beds comprise what I term time-siphons operating on the general principle illustrated in my two prior United States Letters Patent No. 702,066, issued June 10th, 1902, and No. 727,991, issued May 12th, 1903. That is to say, said emptying siphons are so arranged as not to be started in operation to empty the bed by the maximum level of the liquid on the bed, but are brought into operation through a suitable pressure device contained in an adjacent timing chamber into which liquid flows after the bed has been substantially filled. The flow of liquid into the timing chamber may be regulated and may, therefore, be filled in varying predetermined times after the contact bed, with which the siphon is associated, becomes filled. In this manner the liquid sewage remains on the contact beds for the predetermined time to which the apparatus is adjusted, as fully set forth in my aforesaid prior patents.

The siphonic emptying apparatus which is herein shown embraces a deep seal trap, and the outlet end of the trap is so proportioned to the inlet limb of the siphon apparatus that the siphon apparatus is not vented in the usual manner of such siphons, but its emptying operation is prolonged such time as is required to completely discharge the liquid that trickles slowly off the contact bed material. I have disclosed herein two forms of apparatus for accomplishing this result. In one instance, I so arrange the siphon that the invert of the discharge end of the outlet leg of the trap is raised to or about the level of the receiving end of the intake limb of the siphon, and said receiving end of the intake limb of the siphon is located closely adjacent to or below the floor level of the contact bed which the siphon empties. In the other construction the main siphon is arranged in the usual manner, that is, with the invert of the discharge end of the outlet limb of the trap below the level of the receiving end of the intake limb of the siphon, and the siphon is equipped with an auxiliary siphon having an intake limb located with its receiving end below the intake limb of the main siphon and at or below the floor level of the bed, said auxiliary siphon discharging into the outlet limb of the main siphon. The auxiliary siphon thus arranged continues its operation to empty the tank after the operation of the main siphon has ceased.

As shown in the drawings:—Figure 1 is a top plan view of the discharge ends of adjacent contact beds showing my improved emptying apparatus therefor. Fig. 2 is a transverse vertical section thereof. Fig. 3 is a vertical section of one of the siphons and its inclosure or tank, taken in a plane at right angles to the planes in which the siphons are shown in Fig. 2. Fig. 4 is a fragmentary plan view of the discharge ends of the contact beds, showing a modified form of siphonic emptying device. Fig. 5 is a vertical transvers section of the construction shown in Fig. 4. Fig. 6 is a longitudinal section of the auxiliary siphon shown in Figs. 4 and 5.

First referring to the construction shown in Figs. 1 to 3, inclusive, A A A designate contact beds which are distinguished by being designated as beds No. 1, No. 2 and No. 3. B B B designate siphons for emptying said beds. Said siphons are herein shown as contained within chambers or inclosures $A^1$ located at the discharge ends of the contact beds and communicating therewith through pipes $a$ at the floor levels of said contact beds. The siphon (shown in detail in Fig. 3) comprises an intake limb $b$ consisting of an inverted bell-shaped receptacle, a discharge limb $b^1$, and a deep seal trap $b^2$. The upwardly directed discharge end $b^3$ of said trap extends upwardly a distance to bring the invert of the outlet pipe $b^4$ connected with said discharge end of the trap closely coincident with the level of the receiving end of the intake limb of the siphon. Said siphon is provided with the usual venting device C, one limb or member $c$ of which extends downwardly through the bell into the discharge limb of the siphon, and the other member of which extends downwardly outside the receiving limb of the siphon.

The timing feature of the siphonic apparatus herein shown is closely analogous to the construction shown in my aforesaid prior patent No. 727,991. It embraces a chamber D located at one side of the chamber $A^1$ and adapted to be filled from the latter chamber through a filling pipe $d$ extending through the partition wall $d^1$ between said chambers and provided with a valve, whereby the time for filling the chamber D may be regulated and its timing action accordingly adjusted. Contained within said timing chamber is a downwardly opening bell $D^1$ which has communication through a pipe $d^2$, a trap $d^3$ and a horizontal pipe $d^4$ with the air space of the siphon B. As herein shown, the communication of the pipe $d^4$ with the air space of the siphon is afforded through the vent device C, the pipe $d^4$ being connected with the outer leg or member $c^1$, of said vent device. The trap $d^3$ is what may be termed a W-trap, by reason of its general shape and configuration, and operates to interpose a seal between the main siphon and bell $D^1$ in the same manner as described in my prior United States Letters Patent No. 727,991, hereinbefore referred to.

E designates a draw-off pipe through which the chamber D is emptied, said draw-off pipe communicating with the outlet leg of the siphon. The receiving end of said draw-off pipe is located in a well $d^5$ extending downwardly from the floor of the chamber D, whereby said receiving end is sealed.

The operation of the timing apparatus is the same as that set forth in my aforesaid Letters Patent No. 727,991 and need not be further referred to.

The construction heretofore described applies to both forms of the device herein shown so far as relates to the general features mentioned, and the two forms only diverge in the manner in which the prolonged operation of the siphon is brought about.

In the construction shown in said Figs. 1 to 3, inclusive, the invert of the discharge pipe $b^4$ leading from the trap of each of the siphons is located at the substantial level of the receiving end of the intake limb of the siphon, whereby the siphon does not operate to lower the level of the liquid below the said receiving end of the intake limb and the siphon does not, therefore, vent itself automatically as is usual in siphons of this character. Therefore, the siphon remains in operation and allows the water which trickles down from the contact material and collects at the bottom of the chamber to be slowly discharged from or trickle through the siphon; and this prolonged operation of the siphon occurs until the siphon is vented by the special means provided therefor and constituting a feature of my invention, now to be described.

Referring more specifically to Figs. 1 and 2, it will be noted that there is a pressure transmitting pipe F which enters the receiving end of the intake limb of each siphon, and said pipe is connected at its other end with means for transmitting pressure therethrough at the proper period for venting the siphon whose emptying operation has been prolonged. In the present instance, the ends of the pipes remote from the siphons are connected with what may be termed "stop-domes" or downwardly opening bells $F^1$. These "stop-domes" or bells are contained in tanks G G that are suitably located with respect to the contact beds and are filled from the same source supplying liquid to the contact beds. As herein shown, said tanks are located at the discharge ends of the contact beds and closely adjacent to the emptying siphons. Said tanks are filled through filling pipes $g$ at the tops of the tanks, whereby the tank G associated with either of the contact beds will not be filled until the contact bed is substantially filled. The pipe $g$ is of such dimensions as to rapidly fill the chamber G associated therewith. The "stop-dome" of a given tank G is connected through the medium of a pressure transmitting pipe F with the emptying siphon of another contact bed. Thus the emptying siphon of each contact bed continues its operation until another contact bed has been filled, whereupon the tank G associated with the last filled bed is filled therefrom, and as the liquid rises in said tank around the bell $F^1$ therein it acts to force or transfer the air in said bell through the transmitting pipe F to the operating siphon with which it communicates to vent said siphon and discontinue the operation thereof. In the present instance, the siphon emptying contact bed No. 1 is controlled by the rise of liquid in contact bed No. 3, the siphon emptying bed No. 2 is controlled by the rise of liquid in bed No. 1 and the siphon emptying bed No. 3 is controlled by the rise of liquid in bed No. 2. The said "stop-dome" chambers G are emptied by drain pipes H of the form shown in Fig. 2 of the drawing, and said pipes are so arranged as to always lower the level of the liquid in said chambers G below the level of the lower ends of the "stop-domes" $F^1$.

In the construction shown in Figs. 4 and 5 the main siphons are arranged and operate in a manner generally similar to this type of siphon now in use. In the modified construction however, I provide an auxiliary siphon designated as a whole by I, comprising an intake-limb $i$, that is open at its lower end and extends upwardly into the bell or intake-limb of the large siphon, and an outlet limb $i^1$ that extends downwardly into the outlet limb of the main siphon. The receiving end of the intake limb of said auxiliary siphon is located closely adjacent to or below the floor level of the contact bed and said siphon continues in operation after the venting of the main siphon to slowly withdraw the liquid that collects at the bottom of the bed until vented by the means hereinafter described. The said auxiliary siphons are vented through the medium of "stop-domes" J and pressure transmitting pipes $J^1$ in the same general manner as the main siphons of the construction before described are vented. In the present instance the "stop-domes" are located in the chambers containing the main siphons. The essential operation of this form of apparatus, aside from the characteristic features of difference before referred to, is the same as that described in connection with the construction shown in Figs. 1 to 3, inclusive.

The location of the "stop-domes" depends somewhat upon the character of feeding device used to supply the contact bed. If the feeding device operates to fill the bed or other compartments in which the "stop-domes" are located rapidly it will ordinarily be unnecessary to locate the "stop-domes" in a separate chamber to be filled in a special manner but said "domes" may be located in the beds themselves or chambers containing the emptying siphons. If the feed flow be slow the location of the "stop-domes" in the separate chambers which are rapidly filled after the contact beds are filled, is recommended, especially if the emptying siphons be of comparatively large capacity. Moreover, it is obvious that the "stop-dome" may be otherwise located with respect to the regular and sequential flow of a liquid by which the apparatus may be operated in the general manner hereinbefore described.

It will be understood that other forms of emptying apparatus may be employed and that siphonic apparatus without the timing feature may be used.

I claim as my invention:—

1. Means for emptying a liquid tank, as the contact bed of a sewage purifying system, comprising an emptying device through which the liquid contents of the tank are discharged, means whereby the emptying operation of the said device is automatically prolonged after the contents of the tank have been substantially discharged and means operating at a predetermined period thereafter to discontinue the operation of the emptying device.

2. Means for emptying a liquid tank, as the contact bed of a sewage purifying system of that class wherein said tank is periodically filled or charged to a predetermined level, comprising an emptying device through which the liquid contents of the tank are discharged, means whereby the emptying operation of said device is automatically prolonged after the contents of the tank have been substantially discharged, and means controlled by the rise of liquid supplied from a source which fills said tank for discontinuing the operation of said emptying device.

3. Means for emptying a liquid tank, as the contact bed of a sewage purifying system, comprising an emptying device through which the liquid contents of the tank are discharged, means coöperating with said emptying device for maintaining the liquid in the tank for a predetermined time after the tank has been filled, means whereby the emptying operation of said device is automatically prolonged after the contents of the tank have been substantially discharged, and means controlled by the rise of liquid supplied from a source which fills said tank for discontinuing the operation of the emptying device.

4. Means for emptying a liquid tank, as the contact bed of a sewage purifying system, comprising a deep-seal trapped siphon apparatus through which the liquid contents of the tank are discharged, the siphon apparatus and its seal being so proportioned that the emptying flow of liquid through said siphon is prolonged, and means operating at a predetermined period thereafter to discontinue the operation of the emptying device.

5. Means for emptying a liquid tank, as the contact bed of a sewage purifying system, comprising a deep-seal trapped siphon apparatus through which the liquid contents of the tank are discharged, said siphon apparatus and its seal being so proportioned that the emptying flow of liquid through the siphon apparatus is prolonged, and means controlled by the rise of liquid supplied from a source which fills said tank for discontinuing the flow of liquid through the siphon.

6. Means for emptying a liquid tank, as the contact bed of a sewage purifying system, comprising a deep-seal trapped siphon apparatus through which the liquid contents of the tank are discharged, said siphon apparatus and its seal being so proportioned that the emptying flow of liquid through the siphon apparatus is prolonged, and means controlled by the rise of liquid supplied from a source which fills said tank for venting said siphon apparatus.

7. Means for emptying a liquid tank, as the contact bed of a sewage purifying system, comprising a deep-seal trapped siphon apparatus through which the liquid contents of the tank are discharged, said siphon apparatus and its seal being so proportioned that the emptying flow of liquid through the siphon is prolonged, and means controlled by the rise of liquid supplied from a source which fills said tank for transmitting air pressure to the air space of the siphon apparatus in a manner to vent the same.

8. Means for emptying a liquid tank, as the contact bed of a sewage purifying system, comprising a deep-seal trapped siphon apparatus through which the liquid contents of the tank are discharged, the siphon apparatus and its seal being so proportioned that the emptying flow of liquid through said siphon is prolonged, and a downwardly opening dome connected by a pipe with the air space in the siphon apparatus, said dome being located in a chamber supplied by liquid from the source supplying liquid to said tank.

9. Means for emptying a liquid tank, as the contact bed of a sewage purifying system, of that class wherein the tank is periodically filled or charged, comprising, in combination with a plurality of such tanks, of an emptying device for each tank through which the liquid contents are discharged from the tank, means whereby the emptying operation of said device is automatically prolonged after the contents of the tank have been substantially discharged, and means controlled by the rise of liquid in each tank for discontinuing the operation of the emptying device of another tank.

10. Means for emptying a liquid tank, as the contact bed of a sewage purifying system, of that class wherein the tank is periodically filled or charged, comprising, in combination with a plurality of said tanks, of a deep-seal trapped siphon apparatus for each tank through which the contents of the tank are discharged, the siphon apparatus and its seal being so proportioned that the emptying flow of liquid through the siphon is prolonged, and means operated by the rise of liquid in each tank for transmitting air pressure to the air space of the siphon apparatus of another tank for venting the latter siphon apparatus.

11. Means for emptying a liquid tank, comprising a main siphon through which the liquid contents of the tank are discharged provided with a deep-seal trap, an auxiliary siphon associated with the main siphon having its intake limb located closely adjacent to or below the floor of said tank and to the level of the invert of the outlet end of the trap of the main siphon, and means operating after cessation of the emptying flow of liquid through the main siphon for venting the auxiliary siphon.

12. Means for emptying a liquid tank, as the contact bed of a sewage purifying system, comprising, in combination with a plurality of such tanks, of a deep-seal trapped siphon through which the liquid contents of the tank are discharged, an auxiliary siphon associated with each main siphon, having its intake end located closely adjacent to or below the floor of said tank and discharging into the seal of the main siphon, and means operated by the rise of liquid supplied from the source that fills said tank for venting the auxiliary siphon.

In testimony, that I claim the foregoing as my invention I affix my signature in the presence of two witnesses, this 23rd day of May A. D. 1907.

SIDNEY W. MILLER.

Witnesses:
GEORGE R. WILKINS,
DOROTHY E. MARMON.